Oct. 10, 1933.　　　A. H. McCOMB　　　1,929,437
DRYING AND PRESERVING PROCESS FOR FRUITS AND VEGETABLES
Filed Jan. 7, 1928
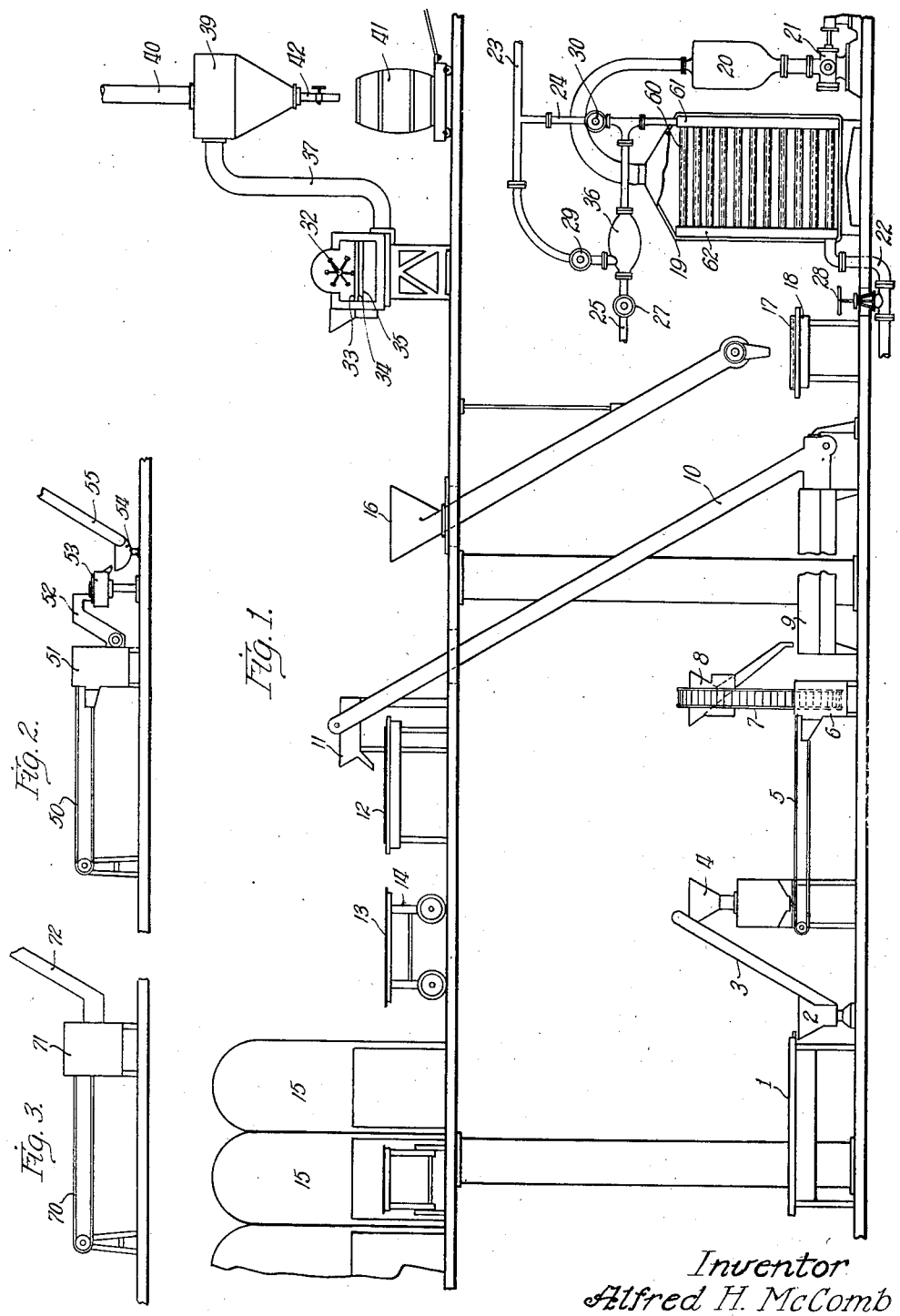
Inventor
Alfred H. McComb
By Brown, Jackson, Boettcher & Diemer
Atty's Patented Oct. 10, 1933

1,929,437

UNITED STATES PATENT OFFICE 1,929,437

DRYING AND PRESERVING PROCESS FOR FRUITS AND VEGETABLES

Alfred H. McComb, Chicago, Ill., assignor of one-half to Everette R. Peacock, Chicago, Ill.

Application January 7, 1928. Serial No. 245,076

4 Claims. (Cl. 99—5)

The present invention relates in general to the method of and means for drying and preserving fruits and vegetables.

One of the objects of my invention is to provide a method of drying fruits and vegetables in which the vitamin content in the product is not altered from the original article.

Another object is to provide a drying process wherein the nutrition value of the product is identical with the original article.

Other objects are to provide a drying process in which the original mineral salts and volatile oils are present in the dried product.

Another object is to provide a drying process in which the original color, aroma and flavor are the same when the dried product is cooked or prepared as when the original fresh product is cooked or prepared.

A further object is to provide a drying process in which fruits and vegetables may be dried in large quantities in a comparatively short length of time.

Another object is to provide temperature control means for regulating the temperature of the drying operation so that the various physical properties of the vegetable or fruit remain the same, as well as those intangible properties such as the vitamin content.

A further object is to provide a process for drying fruits and vegetables in which the product does not have to be soaked before it is cooked in order to be used.

Another object is to provide a process for drying fruits and vegetables in which the dried product will cook in as short interval of time as compared with the original first product and as distinguished from the comparatively long interval of time necessary for the preparation of other fruits and vegetables dehydrated by ordinary processes.

There are other objects of my invention, which, together with the foregoing will be described in the detailed specification which is to follow taken in conjunction with the accompanying drawing forming a part thereof.

Many methods of drying fruits and vegetables have been proposed heretofore. Generally these may be divided into two broad classes, one of which may be designated as an air drying process and the other may be designated as a vacuum drying process. In air drying the moisture is removed from the product by streams of heated air passing over the fruit or vegetable for certain lengths of time. The major water content of the fruit or vegetable is removed within a comparatively short interval of time. For example, two hours, thereafter the removal of the moisture is a rather difficult proposition and requires a considerable amount of time. After about eighteen to twenty-four hours, no further moisture can be removed from the fruit or vegetable by the air drying process. However, even after this period of drying, the vegetable or fruit is not completely dehydrated. Considerable moisture still remains. In fact, I have found the moisture content to be from eight to ten percent and in some instances, even higher. Because of this relatively high moisture content, even after the completion of the drying process, the products will not keep indefinitely.

To prepare this air dried product, it is necessary to soak it in water for anywhere from one to twenty-four hours, depending upon the product, in order to render it suitable for cooking. When the product is cooked, the actual cooking time is not shorter than that of the fresh product and is in the majority of cases considerably longer. The completed product when cooked is readily distinguishable from the freshly cooked article physically by means of the flavor, and color and aroma in most instances. In addition, many of the important nutritive qualities of the fresh fruit or vegetable are entirely lost.

This air drying process destroys all the vitamins in the product. This can be readily determined from the dried product in any suitable manner such as by what are known as feeding tests. Furthermore, a number of other elements in the dried fruit or vegetable are removed by the wind streams passing over them simply by mechanical action. Another result is that in this air drying process, most of the nutritive oils are lost, more especially where the dried product is ground into powder.

In the foregong, it has been stated that this air drying process takes from eighteen to twenty-four hours. This drying process is usually divided into two steps, the first step being in tunnels or drying chambers where 50% to 70% of the moisture may be removed, the last step occurring in what are known as conditioners or conditioning chambers where the moisture content is reduced to 8% to 10%. This conditioning step proceeds at a relatively slow rate and takes the majority of the time.

In the vacuum drying process, the drying of the fruit or vegetable occurs under a comparatively high vacuum. It has been found that by employing a high vacuum that the product may be heated to a considerable extent without deterioration of any of the qualities or properties of the fruit or vegetable either tangible or intangible. However, this vacuum drying process is not adapted for quantity production. In fact, the vacuum drier cannot be operated on more than about one-sixth capacity without interfering with the drying operation. However, since the drying of the fruit or vegetable occurs with a great deal more rapidity under a vacuum than it is possible to proceed with in the air drying process, namely, in from three to four hours, the vacuum drying process can compete with the air drying process. It has also been found that it is possible to raise the temperature of the product during the drying process to a point where a certain amount of cooking takes place. This is important since this pre-cooking reduces the amount of time necessary to prepare or cook the completely dried product to below that necessary for the fresh fruit or vegetable. The temperature necessary to perform this precooking operation is, of course, comparatively low since the product is in a vacuum and under a very low air pressure. It is not necessary to pre-soak it at all before the cooking begins.

However, while this vacuum type of drying presents many advantages over the air drying process described, there is one very serious drawback. It has been found that while it is possible to dry the product very well until the moisture content is low, that in completely drying the product and removing all the moisture, there is great danger of burning the product and spoiling the entire run. This is true because it has been impossible to practically and accurately control the temperature. This accurate control of the temperature is not necessary while there is considerable moisture content in the fruit or vegetable, but when this moisture content is reduced, the difficulty is immediately encountered. This difficulty is such that only about 20% of the vacuum dried fruit or vegetable is suitable for use and has the desired properties. In view of this, vacuum drying is looked upon with disfavor and cannot commercially compete with the air drying process.

In view of the difficulties inherent in each method of drying, neither one presents a satisfactory solution of the problem nor does it present a solution of the problem by which a successful commercial article or product can be obtained. I have found that by a combination of the two processes, all the advantages of the vacuum dried product, including the vitamin content can be obtained together with many desirable results not achieved by either process. Briefly, I have found that the ideal process for drying fruits and vegetables consists essentially in removing a great proportion of their water content by the so-called air drying method. I prefer to employ this air drying method until the product has an equal percentage of water and solid matter. Up until this point, the air drying process may be resorted to without any danger of destroying the vitamins. It has been found that vitamins are destroyed by oxidization and I have determined that this oxidization will not occur unless the product has a smaller percentage of water than of solid matter. When the amount of water in the product is reduced by the air drying process in this manner, I place the article in the vacuum dryer and under a vacuum extract the remaining water content in the product. Under a vacuum, all the air in contact with the product is removed and consequently the oxidization spoken of as being necessary to destroy the vitamin is not present. This permits the product to be dried bone dry with a water content of less than 1% without any destruction of the vitamins in the product. In addition, the flavor, aroma are all present in the product as in the fresh fruit or vegetable. Furthermore, by this process, all the nutritive volatile oils are retained. In order to complete this drying process in the vacuum, it is necessary that heat be applied to the product. However, I have found that it is very difficult to heat the product in a vacuum in such manner as to bring about the necessary drying and not produce a complete destruction of the article by combustion. The explanation of this resides in the fact that in every fruit or vegetable, as well as a great many other materials, a certain amount of oxygen is absorbed in the product and remains there. This oxygen, if the temperature is sufficiently high in the vacuum, will immediately cause combustion, thereby destroying the article and causing great loss. This absorbed oxygen might be designated by the term occluded gas. Another aspect of this same difficulty and perhaps a more serious one to overcome, is to prevent this oxidization or combustion when the vacuum is broken after the product has been completely dried. The heating of the product in the vacuum is brought about by direct conduction. Since there is no air, or at least very little, in the vacuum drying chamber, heating cannot occur by convection. In addition, since a vacuum is the best heat insulator known, after heat has been applied to the product, it is retained by it for a considerable period of time. Thus, when the vacuum is cracked and air admitted thereto, the dried product in the vacuum is at substantially the highest temperature to which it has been raised during the drying process and the product is immediately oxidized or burnt. I have discovered a method of controlling this temperature in the vacuum so that these difficulties are entirely obviated. By utilizing this temperature control, I have found that it is quite possible and in fact desirable to maintain such a temperature in the vacuum drying chamber that the fruit or vegetable will be partially cooked. This means that the dried product may be cooked in a good deal less time than the original fresh product. In addition, by this combination air dry and vacuum process, I have found that it is entirely unnecessary to soak the product before cooking, this having been heretofore a great drawback with dehydrated fruits and vegetables.

By this method of drying including the temperature control of the product in the vacuum, it is possible to dry over five times as much of the product in a single run than has hitherto been possible by the old type of vacuum dehydration. In addition, my combination process makes it possible to completely bring the fruit or vegetable to a bone-dry state in three or four hours depending upon the product. From the foregoing it will be obvious that this improved process is well adapted for commercial use since from the standpoint of production over the old type vacuum drying process, five times as much of the product may be dried in the same length of time without the attendant difficulty of oxidization or combustion of the product during the vacuum drying. Under the former vacuum drying processes, in view of this great danger of oxidization and combustion, it was necessary to give strict attention to the drying operation in order to reduce the combustion to a point where the product could be used. Even under these conditions, only about 20% production could be secured. By my new process, it is possible to predetermine the exact operations necessary, in order to completely dry a product and the control of the vacuum drying apparatus in my process may be in the hands of a relatively unskilled operator without in any way effecting the quality of the product. I am thus able to produce a superior product, one in fact, which it is impossible to tell from the fresh article when it is used in cooking in a quantity many times as great as that heretofore obtained in either the old air drying or vacuum drying processes.

Referring now to the drawing:

Figure 1 shows in diagrammatic form the apparatus involved and the steps necessary in carrying out my improved drying process with respect to all root or what might be termed solid and legume types;

Figure 2 shows a modification of my process and in diagrammatic form the change in apparatus necessary for the application of my improved process to the drying of leaf vegetables such as spinach and cabbage and various fruits and berries;

Fig. 3 illustrates a modified apparatus employing my improved process for drying and preserving grains.

Referring now more particularly to Figure 1, in the lower left hand corner thereof is diagrammatically represented and designated by the reference numeral 1, a vibratory oscillating screen of any usual or well known type. The reference numeral 2 designates a hopper having a conveyor 3 leading from it into another hopper 4, attached to a peeling machine of usual construction. A conveyor belt or picking table 5 leads from the peeling machine to a washer 6 of any well known or suitable construction. The conveyor belt 7 leads from the washer 6 to the slicer 8, which may be of any suitable type. The slicer 8 is provided with a chute leading down to blancher 9. This blancher 9 has a moving belt or conveyor and is provided with water inlets where boiling water may be admitted to it to set the color and produce its other incidental results in a well known manner. A conveyor 10 extends from the blanching machine 9 on the first floor to the hopper 11 on the second floor. The hopper 11 is located in what may be termed the air drying room and has a funnel shaped outlet onto a table 12 that may carry a pan or tray to receive the product. This pan or tray 13 is adapted to be placed upon a truck 14 and conveyed to one of the drying tunnels 15. The tunnels 15 are the usual air drying apparatus where the air and humidity is controlled to produce the proper amount of evaporation or drying of the product. In this instance, the temperature and humidity of the air is controlled so as to produce a product which has about 50% water and about 50% solid matter. After passing through the air drying room, the product is adapted to be conveyed by means of a chute or conveyor 16 to drying trays or receptacles 17 positioned below the opening of the chute on the table 18 in the vacuum room. These trays are then placed in the vacuum dryer 19 which may be of any suitable construction. A condenser 20 and a pump 21 maintain the vacuum and produce the actual drying operation. Hollow shelves 60 are provided in the vacuum dryer and connect on either side to the headers 61 and 62. An outlet opening 22 of a valve 28 therein provides the outlet for the heating and cooling system of the vacuum dryer. Steam is adapted to be admitted to the hollow shelves 60 of the vacuum dryer from the steam pipe 23 through the pipe 24. This admission is controlled through a suitable valve 30. There is also a water connection through the water inlet pipe 25 and the mixing chamber 26 to the header 61. This water is adapted to be controlled by a suitable valve 27. A suitable steam connection is made with the mixing chamber 36 and the amount of steam admitted is controlled by a suitable valve 29. These steam and water connections are for the purpose of controlling the temperature of the vacuum drying chamber and their functioning will be discussed later when the drying of the typical products, fruit or vegetable will be treated more in detail. On the second floor is provided a mill room where powders may be made from the dried product. This mill room is provided with a grinder 71 of any well known or suitable construction. I prefer to employ the type involving the use of a plurality of rotating hammers with the screen below it which determines the size or grain of the powder. I have found that the usual screen provided with machines of this character are unsatisfactory to make a real fine powder. When an attempt is made to make a real fine powder, this screen is broken very quickly. In order to overcome this, I find it desirable to place screens of coarser mesh above and below the screen which actually determines the fineness of the product. These might be termed strengthening screens and are designated by the reference numerals 33 and 35. The screen 34 is the one that actually determines the fineness of the powder. A blow pipe 37 leads to a dust collector 39, a fan being provided to blow the powder through this pipe. In the dust collector 39 the dust goes out the pipe 40 and the powder collects in the bottom thereof and may be packed in suitable receptacles 41 for storage or commercial distribution.

I shall now describe my improved process in operation by setting forth the various treatments and steps in my process by which a typical vegetable such as an onion is dried and finally made into a powder.

The onions are brought in and dumped upon the oscillating screen 1 where the majority of the dirt and foreign matter is removed. These onions are then conveyed into a hopper tube and raised by means of a conveyor 3 to the peeling machine 4. In the case of onions, I find it advantageous to leave most of the peeling on the onion. The reason for this will be discussed when the properties of the onion powder are taken up. The peeling machine can be adjusted so that very little of the peeling is removed. However, I have found that under this adjustment the peeling machine removes a great many of the faulty and rotten onions. From the peeling machine the onions are conveyed by means of the conveyor or picking table 5 to the washer 6 which functions to remove whatever dirt remains on the onion. Whatever rotten onions there are can be manually removed while they are being conveyed on the picking conveyor 5. From the washer 6 the onions are conveyed by means of conveyor 7 to the slicing machine 8. This machine operates to slice the onions into suitable shape. From the slicing machine 8 the onions go directly out by means of a conveyor similar to the conveyor 10 to the hopper 11, the blanching machine 9 not being necessary in this instance. From the hopper 11 the onions are placed in suitable receptacles 13 and are conveyed by means of trucks 14 to the drying tunnel 15. Currents of warm air of proper humidity pass continuously through these tunnels as in the usual air drying process. The air being controlled both with respect to temperature and humidity so that after the onions have been in the tunnels for about three hours they will have a fifty percent moisture content. They are then removed from the tunnels and conveyed by means of the hopper 16 and its associated chute to the vacuum drying room. As has been described hereinbefore the removal of the moisture from the onions until only a 50% (fifty percent) water content is present does not effect the vitamins in any degree whatsoever. This is true because the vitamins are destroyed by oxidization and the onions cannot be oxidized so that the vitamins are destroyed so long as there is at least fifty percent water content. Receptacles or trays 17 are then completely filled with the semi-dried onions, there being seven or eight layers of sliced onions in each tray, instead of only one layer as is usual and necessary in the former vacuum drying processes. These trays are then placed within the vacuum drying machine 19 and suitably stacked on the hollow shelves one above the other so that the machine is completely filled. The valve 28 in the outlet pipe 22 is then opened and steam is then admitted and passes through the hollow shelves 16 by opening the valve 30. Steam is thus blown through the vacuum drying machine for approximately three minutes when the valve 28 is closed and the vacuum machine subjected to the full head of steam for a short period of time, for example, three minutes. It will be understood, of course, that the vacuum pump 21 is immediately operated as soon as the trays are placed in the vacuum machine and the chamber closed so that the vacuum is being obtained for the other operations just described are going forward. The proper vacuum is obtained in the type of machine that I prefer to use in about seven minutes time. After the full head of steam has been applied to the vacuum machine for about three minutes the valve 30 is closed and the valves 27 and 29 are opened, as well as the valve 28. A mixture of steam and water then occurs in the mixing chamber 36, there being a stream of luke warm water flowing through the vacuum machine at this time. That is, the temperature of the water is reduced to the point where there will be no danger of the hollow shelves buckling or cracking by reason of the unequal expansion and contraction due to quick change in temperature. I permit this cooling operation to proceed for a short interval of time having found about three minutes to be satisfactory. The valves 27 and 29 are then regulated so that the water flowing through the vacuum drying machine is heated to about 150 degrees, this being suitable to maintain the onions in the various shelves at a temperature of around 95 degrees F. which I have found to be more suitable to extract all the water from the product and render it bone dry. This temperature of the water is maintained for thirty-five to forty minutes. The vacuum pump may then be stopped and the vacuum opened without there being any danger of any oxidization of the product. It will be understood, of course, that the periods of time mentioned are simply those that have been found suitable for drying onions and, that other products will require different lengths of time. The same result, may, of course, be secured by different time intervals even with respect to onions.

It will be recalled that the trays 17 are filled with seven or eight layers of sliced onions instead of the usual single layer necessary in former vacuum processes. The reason that this may be accomplished is because the majority of the water has been removed from the onion by the air drying process and the onions in this partly dehydrated state can thus be dried in seven or eight layers uniformly in the vacuum drying machine. If an attempt is made to dry green vegetables in such quantities in the vacuum drying machine the drying does not proceed uniformly and it takes a great deal longer time. In fact, even with this longer time the product is unfit for use. In fact, it has been found that even with one layer to completely remove the moisture by the vacuum drying process it requires from three to four hours. In my improved process where the vegetables are partly dehydrated by the air drawing method the moisture can be completely removed for from six to eight times the quantity in one hour or less. It will be appreciated that in a vacuum the heat is conveyed from the hollow shell by direct contact to the various layers and that there is no circulation. In addition since the vacuum is the best heat insulator known the temperature will remain at the highest degree to which it is raised for an indefinite length of time. Consequently when the vacuum is cracked there is great danger of oxidization as has been pointed out. In addition even this high uncontrolled temperature will in the majority of instances destroy substantially all or, at least, a great many of the vitamins in the product by reason of the occluded oxygen in the vegetable. This is true even though the vegetables are first partially dried by the air process as has already been described. That is, this temperature control is essential to the commercial success of this drying process, or in fact, to any vacuum drying process even where there are no tunnels employed to bring about a preliminary dehydration of the product.

The completely dried vegetables are then removed from the vacuum drying machine and are conveyed to the mill room which in the present instance is located on the second floor. The mill 71 grinds the onions to a fine powder, the degree of fineness being determined by the mesh of the screen 34 as has been before described. The product is then conveyed through the blow pipe 37 to the dust collector 39. The dust rises through the outlet pipe 40 and the product is collected in the bottom of the dust collector and placed in suitable receptacles such as barrels 41 where it may be stored or placed in commercial use.

It will be recalled that in this process of making onion powder that most of the skins are employed. The effect of the use of these skins is to entirely eliminate the caking which has heretofore been present in practically all onion powders whether made by the vacuum process or the air drying process. It appears that this caking is brought about by an excess of oil in the onion. I believe that the use of the skins in making this powder in some manner absorbs or dilutes this oil content. At any rate, I have found that the product when the skins are retained does not cake.

If the onion powder should cake, by reason of having been in contact with moisture to such an extent that considerable moisture is absorbed, the powder can be restored to its original efficiency by passing through the vacuum drying system just described, it being obvious, of course, that under these conditions the air drying step is not needed. This is something that it has heretofore been impossible to do. An onion powder made by the air drying process cannot be restored by air drying.

This onion powder retains all the vitamins since oxidization has been completely eliminated in the process. In addition, the onion powder retains all the original flavor, aroma and nutritive oils that are present in the fresh product.

Heretofore, by reason of the tendency of the onion powder to cake, due to the presence of a considerable quantity of oil, it has been necessary to partially oxidize it in order to burn this oil. Not only did this destroy the vitamins to a large extent but also it weakened the powder Thus, this dried onion powder is greatly superior as a result of having been manufactured by the process outlined.

In drying root vegetables, the process followed is identically the same as that already described, with the exception that from the slicing machine 8 the root vegetables are conveyed through the blanching machine 9, where they are brought in contact with hot or boiling water. This fixes their color and hydrolizes the product; that is, changes some of the starch to sugar. From this blanching machine the root vegetables are conveyed by means of the conveyor 10 to the hopper 11. They then proceed to the drying tunnel and through the vacuum drying room in the same manner as has already been described. After they are removed from the vacuum dryer 19, they are packed unless it is desired to make certain of them into powder. These rude vegetables after coming from the vacuum dryer, retain all the characteristics of the fresh vegetable including the vitamins, and when they are prepared do not have to be pre-soaked. It should be noted that since it is possible to control the temperature of the vacuum dryer, that the vegetables to be dried can be partially cooked so that after drying they may be cooked in but a fraction of the time necessary for the fresh vegetable. Since this pre-cooking takes place under a vacuum, it has no effect appreciably on the vitamin content, flavor, etc. In addition, since it is under a vacuum, the cell structure is not broken down by this pre-cooking operation.

All root vegetables and certain other vegetables such as egg plant, squash, pumpkin and legumes may also be prepared and dried in identically the same manner just described going through all the steps of the process.

In Figure 2, a slightly modified form of my invention is shown which involves a conveyor 50 which carries the vegetables into a washer 51. A conveyor 52 then conveys the vegetables to a slicer 53, from here they are conveyed by the conveyor 55 which is similar to the conveyor 10 into the drying room where they go into a hopper similar to the hopper 11.

This modified system is adapted for the treatment and drying of such vegetables as cabbage, parsley, celery, garlic, and also certain fruits; pineapples, apples, oranges, grapefruit, peaches, pears, apricots, etc. The drying operation is identically the same in this instance as before, the machine or set-up having been modified simply to take care of the different characteristics of the various fruits and vegetables in preparing them for drying.

Certain other fruits and vegetables, for example, spinach, lettuce and fresh leaf vegetables and oranges, apples, berries, prunes and apricots are prepared for drying in various ways and they are then conveyed to the air drying room and then proceed through the drying process including the vacuum drying machine as described. In this preliminary preparation, of course, certain of the vegetables or fruits are variously treated to prepare them for drying—apples being peeled and cored, oranges being peeled, pineapples being peeled and sliced.

It is thought that the manner of preparing various fruits and vegetables for drying is entirely obvious and need not be further described. The drying process just described including a partial dehydration by means of air and then a complete dehydration under the vacuum being all that is necessary to preserve the vitamins and other desirable characteristics in addition to eliminating soaking and reducing the time required for the preparation of the cooked product.

In Figure 3, I have shown a slightly modified apparatus which may be used to take care of the preservation of grains such as corn, oats, barley, wheat, rice, etc. The preliminary preparation of these grain products merely requires a conveyor 70 which conveys the grain into a fanning mill 71, this fanning mill performing its old and well known function of cleaning the grain, removing the dust and impurities therefrom. From the fanning mill, the grain is conveyed to the air drying room where the moisture is partially removed until there is about a 50% moisture content by the air drying process and it is then passed to the vacuum drying chamber. The grain may be then placed in the vacuum dryer and brought to any degree of moisture desired. This process is particularly advantageous in drying grains for the reason that such drying can take place without destroying any of the nutriments in the grain or without destroying its germinating power, the only effect of the drying being to reduce the weight and to render it in such state that it may be stored for indefinite periods of time. The grain may be sowed and will germinate even after being stored for many years. Not only does this drying reduce the cost of handling the grain, but it preserves it. Certain of the legumes such as peas and beans may be treated in identically the same manner as the grain with the exception that it would probably be desirable to put them through the blancher in order to fix their color. Of course, this is speaking of peas and beans after the shells have been removed and when they are in their green state. These vegetables after being passed through the blancher would then be conveyed to the air drying room and then to the vacuum dryer as before. Peas treated in this manner when used for cooking do not have to be pre-soaked and yet have all the characteristics of the fresh vegetable when used for cooking in addition to its nutritive quality. I have mentioned peas in this connection because heretofore it has been impossible to obtain a satisfactory dried pea product for commercial use.

While I have described certain specific methods by means of certain apparatus, it will be understood that I do not desire to be limited thereto, but desire to protect by Letters Patent all modifications, changes and deviations from the specific method described and from the apparatus used that come within the scope of the appended claims.

I claim:

1. The process of rapid drying of moisturecontaining material which comprises, first extracting substantially one-half of the moisture contained therein by subjecting the material to the influence of a dry, warm, gaseous fluid, and thereupon placing the thus partially dried material in a vacuum, applying heat indirectly thereto to cause removal of the balance of the moisture, and cooling the material in the vacuum to a temperature sufficiently low so that air may be allowed to come into contact with the material without oxidizing the same.

2. The process of drying onions which comprises slicing the same, subjecting the slices to air drying until the solid content thereof is substantially fifty percent, then placing said slices in a vacuum, heating them to steam temperature for a short period, and then heating them to a temperature between about 95° and 150° F. until substantially the balance of the moisture therein has been removed.

3. The process of drying, consisting of first subjecting undried matter to air drying and thereby removing an amount of moisture therefrom such as will not distort the natural properties of and not cause oxidation of said matter, and thereupon placing the treated matter in a vacuum, applying heat to the matter in vacuum to cause removal of the remainder of the moisture therefrom, and cooling the matter in the vacuum to a temperature sufficiently low so that air may be allowed to contact with said matter without oxidizing the same.

4. The process of drying, consisting of first subjecting undried matter to air drying and thereby removing an amount of moisture therefrom such as will not distort the natural properties of and will not cause oxidation of said matter and at the same time, effect partial drying thereof to a definite and material degree, thereupon placing the treated matter in a vacuum, applying heat thereto to remove the remainder of moisture from the matter, and cooling the matter in the vacuum to a temperature sufficiently low so that air may be allowed to come into contact therewith without oxidizing the same.

ALFRED H. McCOMB.